United States Patent [19]
Ota et al.

[11] Patent Number: 5,364,275
[45] Date of Patent: Nov. 15, 1994

[54] MEMORY CARD CONNECTOR

[75] Inventors: Yoshiyuki Ota; Masaki Sakaoka, both of Kanagawa, Japan

[73] Assignee: Kyocera Elco Corporation, Kanagawa, Japan

[21] Appl. No.: 51,856

[22] Filed: Apr. 26, 1993

[30] Foreign Application Priority Data

Jul. 20, 1992 [JP] Japan .................................. 4-192243

[51] Int. Cl.[5] .............................................. H05K 1/00
[52] U.S. Cl. ........................................ 439/65; 439/79; 439/157; 439/540
[58] Field of Search ......................... 439/71–74, 439/525, 67, 77, 80–83, 79, 630, 540, 153, 157, 65

[56] References Cited

U.S. PATENT DOCUMENTS

| | | | |
|---|---|---|---|
| 3,221,286 | 11/1965 | Fedde | 439/67 |
| 3,880,493 | 4/1975 | Lockhart, Jr. | 439/525 |
| 4,364,620 | 12/1982 | Mulholland et al. | 439/525 |
| 4,878,856 | 11/1989 | Maxwell | 439/540 |
| 5,176,523 | 1/1993 | Lai | 439/540 |
| 5,205,741 | 4/1993 | Steen et al. | 439/77 |

Primary Examiner—David L. Pirlot

[57] ABSTRACT

A memory card connector assembly superimposed on a substrate includes a plurality of memory card connectors stacked on top of each other whose contacts are to be connected to corresponding terminals of associated memory cards. The contacts of a lowermost memory card connector are soldered to the substrate, and the contacts of at least one upper memory card connector are connected to an FPC board.

11 Claims, 5 Drawing Sheets

MEMORY CARD CONNECTOR

BACKGROUND OF THE INVENTION

1. Field of the Invention

The present invention relates to a memory card connector, and more precisely, it relates to a memory card connector assembly superimposed on a substrate comprising a plurality of memory card connectors.

2. Description of Related Art

There is known a memory card connector assembly having a plurality of memory card connectors that are stacked on a substrate, so that a plurality of memory cards (e.g., IC cards) can be connected to the corresponding memory card connectors to read information recorded in the memory cards at the same time. In such a known multi-layered memory card connector consisting of, for example, upper and lower connectors, groups of contacts of the upper and lower (first and second) connectors are respectively soldered to the substrate. Upon soldering, an array of contacts from the first connector (referred to as a first contact array) is first soldered to the substrate, and thereafter, another array of contacts from the second connector (referred to as a second contact array) is soldered to the substrate.

In practice, none of the solder connections of the first contact array are visible after the soldering of the second contact array is completed. Consequently, if part of the solder connection of the first contact array is defective, re-soldering of the defective connection cannot be carried out due to interference by the second contact array. This becomes more serious when the number of layers of the connectors (memory card contact arrays) increases.

Furthermore, in a conventional multi-layered memory card connector whose contacts are all soldered to the substrate, the surface area for solder connection on the substrate is soon exhausted, thus limiting the mounting density of the substrate.

SUMMARY OF THE INVENTION

The primary object of the present invention is to provide an improved memory card connector which can eliminate the above-mentioned drawbacks.

To achieve the object mentioned above, in a multi-layered memory card connector assembly superimposed on a substrate having a plurality of stacked card connectors, according to the features of the present invention, the contacts of only the lowermost card connector, which is located on the substrate, are soldered to the substrate; and the contacts of the remaining card connector or connectors are electrically connected to the substrate or an external device through an FPC board without being directly soldered to the substrate.

Namely, according to an aspect of the present invention, there is provided a memory card connector assembly superimposed on a substrate having a plurality of stacked memory card connectors whose contacts are to be connected to corresponding terminals of associated memory cards, wherein the contacts of a lowermost memory card connector are soldered to the substrate and the contacts of at least one upper memory card connector are connected to an FPC board.

According to another aspect of the present invention, there is provided a memory card connector apparatus comprising a plurality of memory cards, each having a memory means and a group of terminals connected to the memory means, and a plurality of stacked memory card connectors, each having a group of contacts connected to the terminal group of the memory cards, wherein the memory card connector closest to the substrate is provided with connecting portions to be soldered to the substrate, and none of the remaining memory card connector or connectors being soldered to the substrate.

According to still another aspect of the present invention, a memory card connector assembly comprises a plurality of frames that are stacked on a substrate and having contact supporting wall surfaces, groups of contacts provided in the respective frames to inwardly and outwardly project from the contact supporting wall surfaces, so that the inwardly projected ends of the contacts in each frame can be disengageably connected to receptacle terminals of an associated memory card, wherein the outwardly projected ends of the contacts of the frame located closest to the substrate are provided with connecting portions which are soldered to the substrate, and the outwardly projected ends of the contacts of the remaining frame or frames are not directly connected to the substrate.

According to still another aspect of the present invention, there is provided a memory card connector assembly superimposed on a substrate comprising a plurality of stacked memory card connectors, each having a plurality of rows of contacts and an insertion opening in which an associated memory card can be inserted to be connected to the respective contacts, a plurality of insulation frames to receive the respective memory card connectors, at least one flexible printed circuit board which is connected to at least one memory card connector other than a lowermost memory card connector closest to the substrate, and means for directly soldering the contacts of only the lowermost memory card connector to the substrate.

The present disclosure relates to subject matter contained in Japanese patent application No. 4-192243 (filed on, Jul. 20, 1992) which is expressly incorporated herein by reference in its entirety.

BRIEF DESCRIPTION OF THE DRAWINGS

The invention will be described below in detail with reference to the accompanying drawings, in which.

DESCRIPTION OF THE PREFERRED EMBODIMENT

The illustrated embodiment of the present invention is applied to a two-layered memory card connector assembly.

Figure 6:
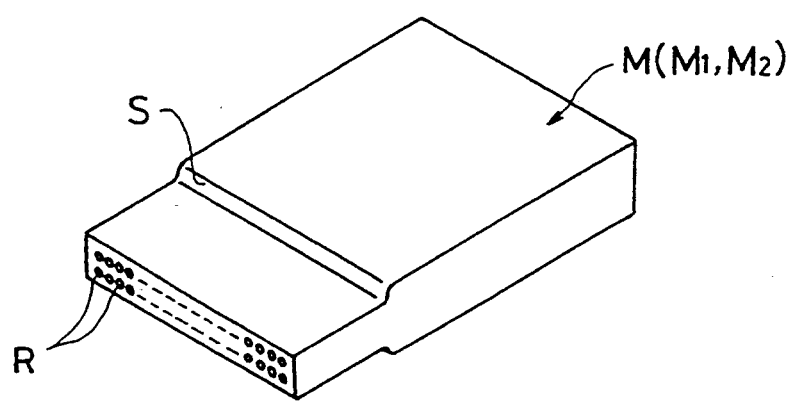
FIG. 6 is a isometric view of a single memory card according to the present invention.

FIG. 6 shows a single memory card M which is provided on one end thereof with two arrays of upper and lower receptacle terminals R, and on upper and lower surfaces thereof with shoulder portions S, respectively. The memory card M is also provided therein with a memory means, such as an IC, connected to the receptacle terminals R, so that information can be recorded in the memory through the receptacle terminals R, or information stored in the memory can be retrieved through the receptacle terminals R. The subject of the present invention is not directed to the kind and internal structure of the memory means of the memory card M.

Figure 3:
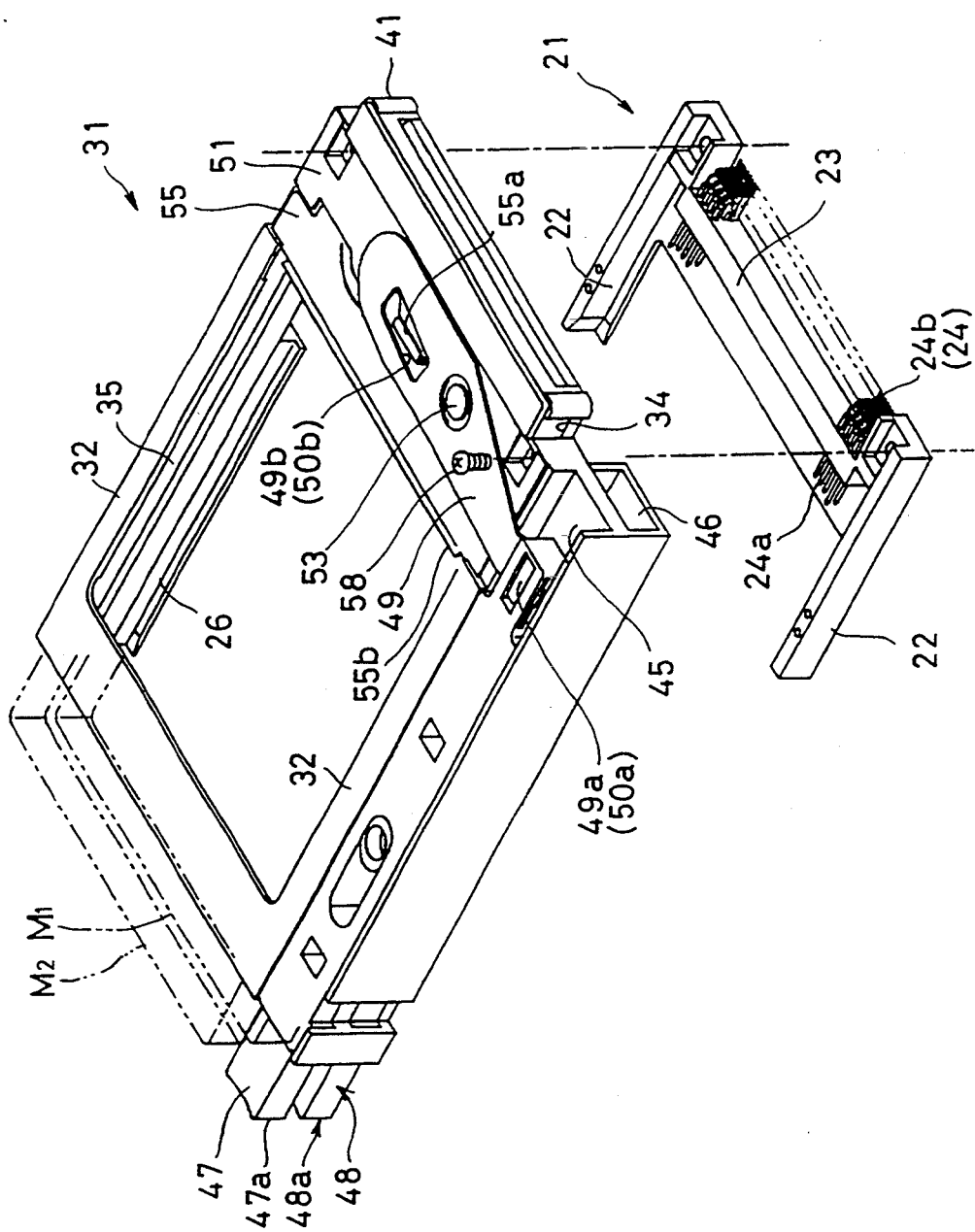
FIG. 3 is an exploded isometric view of upper and lower connectors according to the present invention.

A substrate 11 of a memory card connector to which two memory cards M can be connected is provided thereon with lower and upper insulation frames 21 and 31 of lower and upper memory card connectors 20 and 30, secured to the substrate 11, respectively. The upper insulation frame 31 is superimposed on the lower insulation frame 21 on the substrate 11. As can be seen in FIG. 3, the generally U-shaped lower insulation frame 21 has right and left side walls 22 and a contact holder 23 extending between the side walls 22. The contact holder 23 holds upper and lower arrays of contacts 24, each having connector pins 24a which can be connected to the associated receptacle terminals R of the memory card M and soldering portions 24b which can be soldered to the substrate 11.

Figure 1:
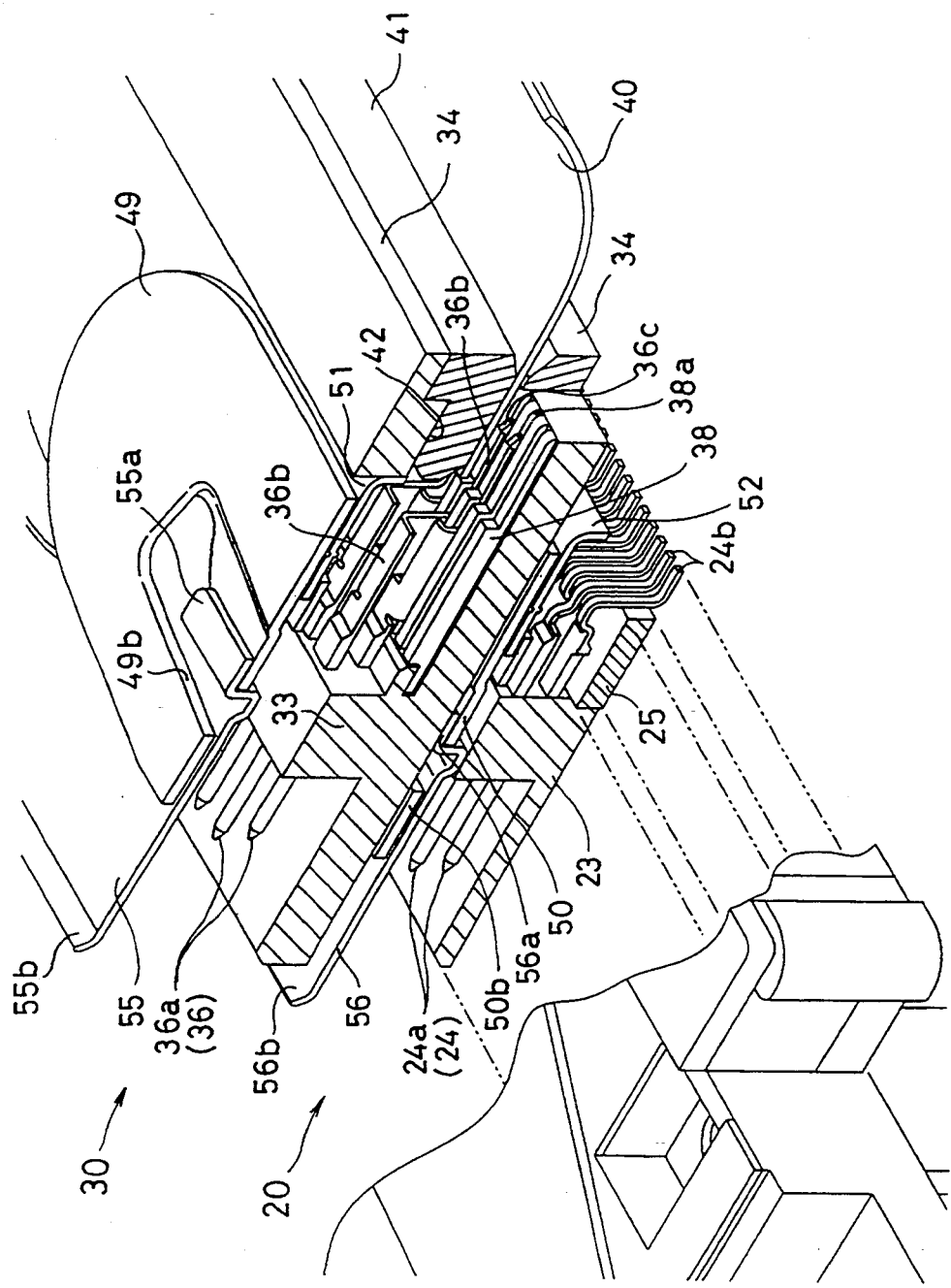
FIG. 1 is a partially broken isometric view of a main part of a memory card connector according to the present invention.
Figure 2:
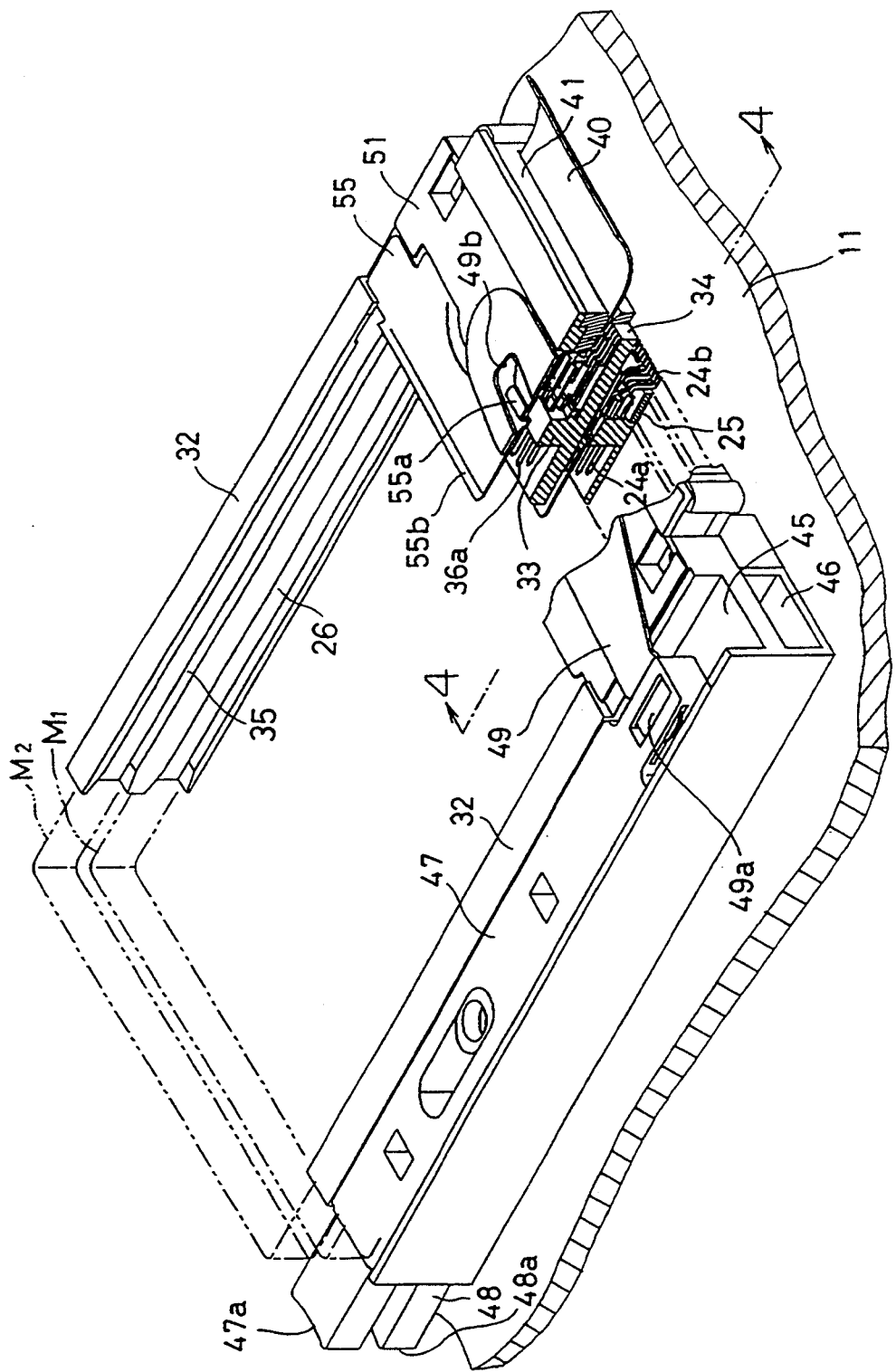
FIG. 2 is a partially broken isometric view of a whole memory card connector according to the present invention.

The soldering portions 24b are bent in a generally L-shape, so that the bent ends are aligned in a same plane, as shown in FIG. 1. Namely, the soldering portions 24b corresponding to the upper connector pins 24a are alternately located at the bent ends thereof between the adjacent soldering portions 24b corresponding to the lower connector pins 24a, so that the lateral pitch of the aligned soldering portions 24b is substantially half that of the upper or lower connector pins 24a.

A guide block 25 is provided between the lower insulation frame 21 and the soldering portions 24b to prevent the latter from being accidentally deformed.

The upper insulation frame 31 has right and left side walls 32, a contact holder 33 extending between the side walls 32, and an FPC board support 34. The side walls 32 are provided with lower and upper separate guide grooves 26 and 35 in which the lower memory card M1 and the upper memory card M2 can be inserted to be connected to the lower connector 20 and the upper connector 30, respectively. The contact holder 33 holds upper and lower arrays of contacts 36, each having contact pins 36a which can be connected to the upper memory card M2, similar to the contact holder 23; but the contacts 36 are not provided with a soldering portion. The contacts 36 have, instead, connecting legs 36b which can be connected to an FPC (flexible printed circuit) board 40, corresponding to the soldering portions 24b of the contacts 24.

Similar to the soldering portions 24b, the connecting legs 36b corresponding to the upper connector pins 36a are alternately located at the outer ends thereof between the adjacent connecting legs 36b corresponding to the lower connector pins 36a, so that the lateral pitch of the aligned connecting legs 36b is substantially half that of the upper or lower connector pins 36a, as can be seen in FIG. 1. The connecting legs 36b are inserted in corresponding guide grooves 38a provided in a contact guide provided on the contact holder 33.

Figure 4:
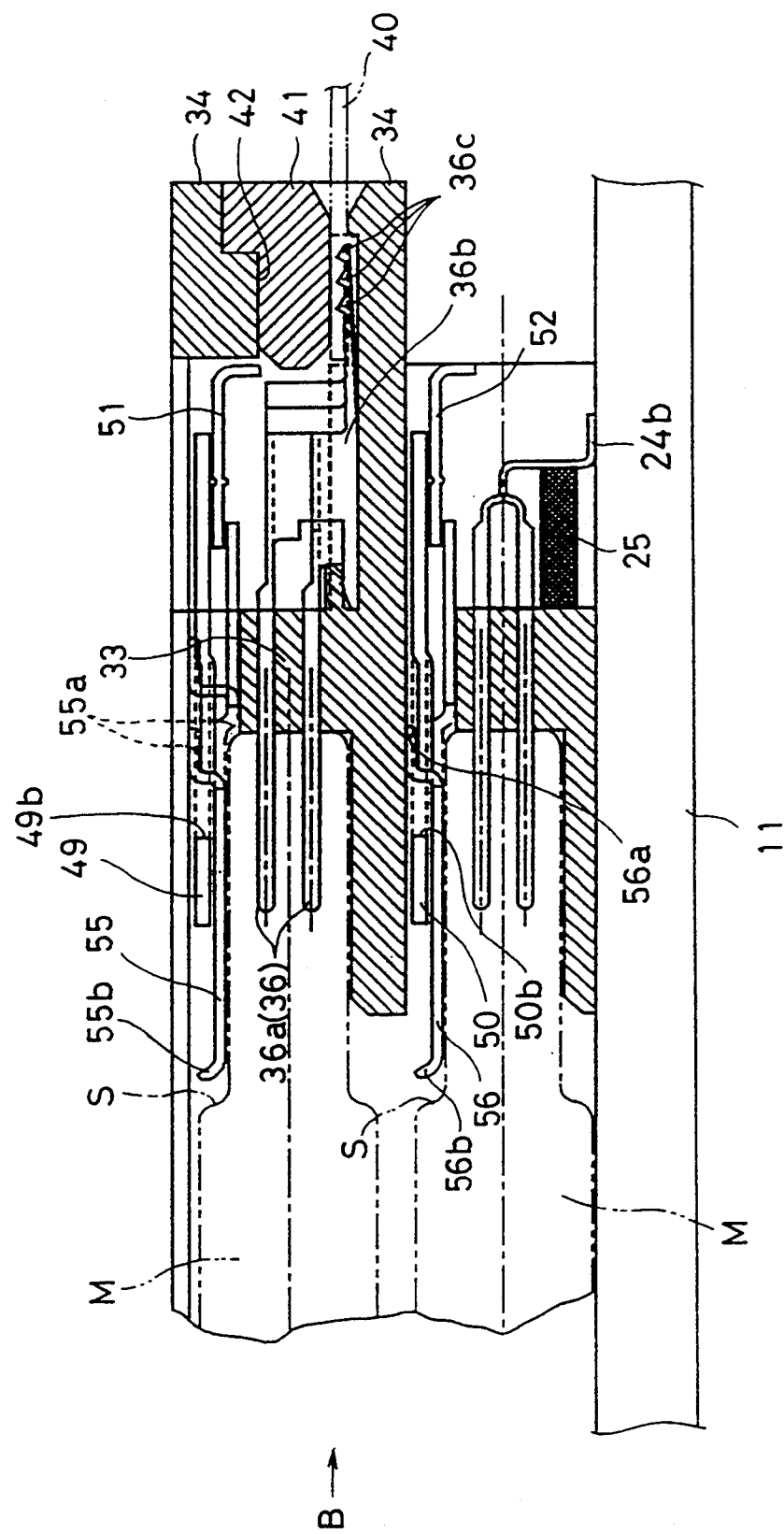
FIG. 4 is a sectional view taken along the line 4—4 in FIG. 2.
Figure 5:
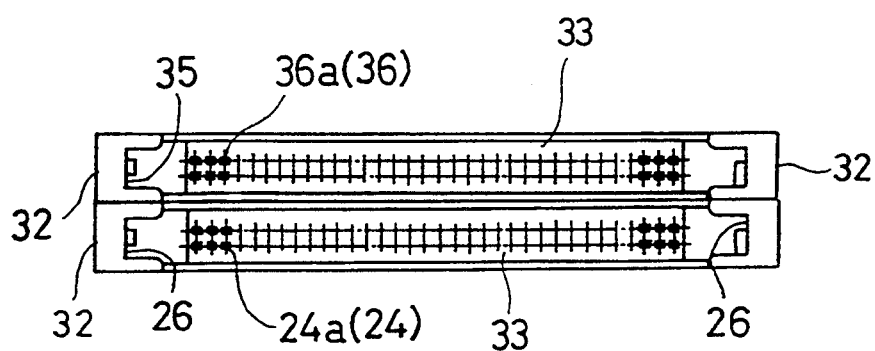
FIG. 5 is an end view in the direction B in FIG. 4.

The connecting legs 36b are provided on the front ends thereof with connecting projections 36c projecting upward therefrom. The positions of the connecting projections 36c in the direction of the length of the connecting legs are appropriately determined in accordance with a conductor pattern (conductor lands) of the FPC board 40, as shown in FIG. 4.

The FPC board support 34 has an insertion groove 42 in which the FPC board 40 and a slider 41 are inserted. The slider 41 is inserted to press the FPC board 40 onto the connecting projections 36c of the contacts 36 to thereby ensure an electrical connection between the conductor lands of the FPC board 40 and the connecting projections 36c. The FPC board support 34 is provided with an engaging member (not shown) which is disengageably engaged by the slider 41 to firmly hold the same when the slider 41 is inserted in the insertion groove 42.

The upper insulation frame 31 has substantially identical ejectors for ejecting the lower and upper connectors 20 and 30, respectively. Namely, one of the side walls 32 is provided with upper and lower slide channels 45 and 46 in which ejecting members 47 and 48 are slidably inserted. The ejecting members 47 and 48 are provided on the rear ends thereof with pressing portions 47a and 48a. The ejecting members 47 and 48 are engaged at the front ends thereof by front ends 49a and 50a of ejection levers 49 and 50. The ejection levers 49 and 50 are rotatable about respective shafts 53 (only one of which is shown in FIG. 3) provided on base plates 51 and 52 secured to the upper insulation frame 31. The ejection levers 49 and 50 are provided on the rear ends with elongated holes 49b and 50b in which projections 55a and 56a of ejection plates 55 and 56 are fitted. The ejection plates 55 and 56 are slidably supported on the upper insulation frame 31 to linearly move parallel to the direction of the insertion of the memory card M1 or M2. The ejection plates 55 and 56 are provided on the rear ends thereof with pressing bent ends 55b and 56b which come into contact with the shoulder portions S of the memory cards M1 and M2 when the memory cards are inserted in the upper and lower connectors.

The memory card connector assembly as constructed above is assembled on the substrate 11, as follows.

Firstly, the soldering portions 24b of the contacts 24 of the lower insulation frame 21 are soldered to the associated terminals (not shown) of the substrate 11. Thereafter, the upper insulation frame 31 is superimposed on the lower insulation frame 21 and they are secured to the substrate 11 by set screws 58 (FIG. 3). After or before the fastening by the set screws 58, the slider 41 is detached from the FPC board support 34 (insertion groove 42) of the upper insulation frame 31, and one end of the FPC board 40 is then inserted in the insertion groove 42. Thereafter, the slider 41 is inserted in the insertion groove 42, so that the conductor lands of the FPC board 40 are electrically connected to the associated contacts 36 through the connecting projections 36c. The other end of the FPC board 40 is connected to other terminals on the FPC board 11 or another external device, etc.

Consequently, the lower and upper memory cards M1 and M2 can be inserted in and removed from the corresponding lower and upper connectors 20 and 30 of the connector assembly, respectively. Namely, the lower memory card M1 is guided by the guide grooves 26 of the upper insulation frame 31 and the side walls 22 of the lower insulation frame 21 when the memory card M1 is inserted in the lower connector 20, so that the receptacle terminals R of the memory card M1 are electrically connected to the connector pins 24a of the lower connector 20. On the other hand, the upper memory card M2 is guided by the guide grooves 35 of the upper insulation frame 31 when the memory card M2 is inserted in the upper connector 30, so that the receptacle terminals R of the memory card M2 are electrically connected to the connector pins 36a of the upper connector 30. Thus, data stored in the memory cards M1 and M2 can be read through the contacts 24 (substrate 11) and the contacts 36 (FPC board 40).

When the memory card M1 or M2 is detached from the connector 20 or 30, the ejection member 47 or 48 is pressed. The operation caused by the ejection member 48 is the same as that of the ejection member 47 excepting the fact that it causes a different memory card to be ejected, and accordingly, the following discussion will be directed only to the operation by the ejection member 47.

When the pressing portion 47a of the ejection member 47 is pressed to advance the ejection member 47, the ejection lever 49 is rotated about the shaft 53, so that the rearward movement of the ejection plate 55 takes place through the elongated hole 49b and the projection 55a fitted therein. As a result, the bent end 55b of the ejection plate 55 presses the shoulder portion S of the associated memory card M2, so that the memory card M2 can be disconnected from the connector pins 36a.

It should be appreciated that in the present invention, the contacts 24 of the lower connector 20 are soldered to the substrate 11, and the contacts 36 of the upper connector 30 are connected to the FPC board 40 without being soldered thereto. Consequently, the contacts 24 are visible without being covered by the contacts 36, so that the solder connection of the contacts 24 can be easily and visually inspected by an operator. Consequently, if there is a defective solder connection, the re-soldering of the contacts 24 or an exchange thereof, if necessary can be easily carried out. It is also possible to automatically mount the lower frame 21 to the substrate 11.

Although the above discussion has been directed to an embodiment applied to a two-layered memory card connector, the present invention is not limited thereto and can be generally applied to a multi-layered memory card connector. In the illustrated embodiment, since the lower insulation frame 21 is different in shape from the upper insulation frame 31, and the ejection mechanisms of the upper and lower connectors 20 and 30 are both provided only on the upper insulation frame 31, the shape and structure of the lower insulation frame 21 can be simplified. Alternatively, it is possible to stack two memory card connectors which are identical in shape except for the FPC board support 34 of the upper connector.

As can be understood from the above discussion, according to the present invention, since the contacts of the lowermost memory card connector secured to the substrate are soldered to the substrate, and the contacts of upper memory card connector (or connectors) are connected to an FPC board through which the upper memory card connector (or connectors) can be connected to the substrate or an external device, the solder connection of the lowermost memory card connector is visible without interfering with the upper memory card connector (or connectors), so that the re-soldering of a possible defective solder connection or an exchange thereof can be easily effected. Furthermore, according to the present invention, the area necessary for the solder connection of the contacts can be reduced, thus increasing the number of electronic elements which can be mounted on the substrate.

We claim:

1. A memory card connector assembly having a plurality of memory card connectors that are stacked on a substrate, whose contacts are to be connected to corresponding terminals of associated memory cards, wherein the contacts of a lowermost memory card connector are soldered to the substrate and the contacts of at least one upper memory card connector are connected to an FPC board, and an insulation frame which is provided with an FPC board holder which supports the FPC board.

2. A memory card connector assembly according to claim 1, wherein said FPC board holder comprises an insertion groove in which the FPC board is inserted, and a slider which can be detachably inserted in the insertion groove to come into slide contact with the FPC board inserted in the insertion groove to thereby press the FPC board onto the contacts to be connected to the FPC board.

3. A memory card connector assembly according to claim 2, wherein the contacts of said at least one upper memory card connector are provided with connecting projections which can be connected to the FPC board.

4. A memory card connector apparatus comprising:
a plurality of memory cards, each having a memory means and a group of terminals connected to the memory means;
a plurality of memory card connectors that are stacked on a substrate, each having a group of contacts connected to the terminal group of the memory cards;
wherein the memory card connector closest to the substrate is provided with connecting portions to be soldered to the substrate, and the remaining memory card connector or connectors are provided with connecting portions to be connected to an FPC board; and
an insulation frame which is provided with an FPC board holder which supports the FPC board.

5. A memory card connector assembly according to claim 4, wherein said memory card connectors comprise ejectors which eject the associated memory cards inserted therein.

6. A memory card connector assembly comprising;
a plurality of frames that are stacked on a substrate and having contact supporting wall surfaces; and,
groups of contacts provided in the respective frames to inwardly and outwardly project from the contact supporting wall surfaces;
wherein the inwardly projected ends of the contacts in each frame can be disconnectably connected to receptable terminals of associated memory cards;
wherein the outwardly projected ends of the contacts of the frame located closest to the substrate are provided with connecting portions which are soldered to the substrate;
wherein the outwardly projected ends of the contacts of the remaining frame or frames are connected to an FPC board; and,
one of said frames being an insulation frame which is provided with an FPC board holder which supports the FPC board.

7. A memory card connector assembly comprising;
a plurality of memory card connectors, each having a plurality of rows of contacts and an insertion opening in which an associated memory card can be inserted to be connected to the respective contacts;

a plurality of insulation frames that are stacked on a substrate to receive the respective memory card connectors;

at least one FPC board which is connected to at least one memory card connector other than a lowermost memory card connector closest to the substrate;

means for directly soldering the contacts of only the lowermost memory card connector to the substrate; and one of said insulation frames being provided with an FPC board holder which supports the FPC board.

8. A memory card connector assembly according to claim 7, further comprising a pressing means for ensuring an electrical connection of the flexible circuit board to the contacts of said at least one memory card connector other than the lowermost memory card.

9. A memory card connector assembly according to claim 8, further comprising a guide means for guiding the insertion of the memory cards into the respective insertion openings.

10. A memory card connector assembly according to claim 9, further comprising an ejecting means for automatically ejecting the memory cards inserted in the associated insertion openings therefrom.

11. A memory card connector assembly according to claim 9, wherein said guide means is provided on only one of the insulation frames.

* * * * *